July 29, 1930.  A. J. HASWELL  1,771,438
MEANS FOR PREVENTING RADIOINTERFERENCE FROM ELECTRIC MOTORS
Filed Nov. 26, 1928  2 Sheets-Sheet 1

Arthur James Haswell INVENTOR
BY Matthew G. Bradley ATTORNEY

July 29, 1930.   A. J. HASWELL   1,771,438
MEANS FOR PREVENTING RADIOINTERFERENCE FROM ELECTRIC MOTORS
Filed Nov. 26, 1928   2 Sheets-Sheet 2

Arthur James Haswell INVENTOR

BY *(signature)* ATTORNEY

Patented July 29, 1930

1,771,438

UNITED STATES PATENT OFFICE

ARTHUR JAMES HASWELL, OF LONDON, ENGLAND, ASSIGNOR TO OTIS ELEVATOR COMPANY, OF NEW YORK, N. Y.

MEANS FOR PREVENTING RADIOINTERFERENCE FROM ELECTRIC MOTORS

Application filed November 26, 1928, Serial No. 321,914, and in Great Britain January 18, 1928.

This invention relates to means for controlling or preventing electrical interference with wireless telegraphic or telephonic installations from operating dynamo-electric machinery such as electric motors.

The object of the present invention is to obviate or cure this trouble and to provide means in association with electric motors or other dynamo-electric machines, which are adapted to eliminate the kind of interference and effects referred to above, by rendering the machine and adjacent parts inert so far as the reception of radio transmission in the neighborhood of the machine is concerned.

It is well known that an electric motor adapted for elevator operation sets up disturbances which may be due primarily to commutation and which appear to circulate over the entire motor and bed plate and are communicated to the ropes and elevator shaft.

It has previously been proposed to reduce or prevent this disturbance by introducing across the brushes of the motor static condensers of relatively large capacity, grouped in series, the connection between the condensers being maintained at earth potential, but it has been found in practice that this method is not successful or is indifferently or only partially successful.

The invention comprises a method of preventing interference with wireless installations from operating electric motors consisting broadly in eliminating electric oscillations by insulating the motor frame from earth and connecting the brushes in closed circuit with the motor frame through a capacity.

According to the invention the electric motor or other machine is insulated both from its bed plate and power coupling, that is, the casing of the machine is electrically isolated from earth, and condensers are connected across the brush holders and have a common return connection taken back to the insulated frame of the machine.

The commutation of the armature should be adjusted to prevent sparking or to reduce the same to a minimum, the brush rocker being located in or as near as possible to the neutral zone. The brushes to be employed should be of low density, such as for example brushes of graphite or graphite composition, so as to reduce resistance at the point of brush contact to as low an amount as practicable.

A further feature of the invention consists in providing means for automatically earthing the frame of the electric motor or other dynamo-electric machine to avoid accidents when the motor is not working or when inspection is desired.

The value of the condenser capacity in the circuit may be varied according to the particular characteristics of the motor to be treated but a capacity should be chosen which is adapted to tune the closed circuit to the frame such that the oscillations are inaudible in the receiving set.

In the accompanying drawings:—

Figure 1:
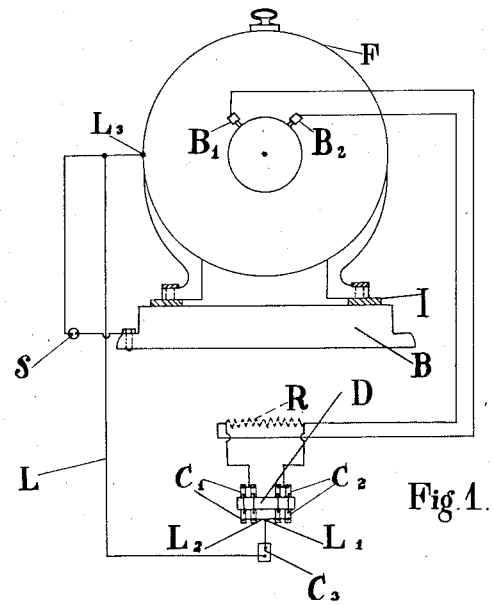
Figure 1 illustrates diagrammatically an electric motor arranged according to an embodiment of the invention.

In carrying the invention into effect according to one method in which it is applied to an electric motor, the motor frame F (Figure 1) is insulated from the bed plate B by suitable insulating material I. The brushes $B^1$ and $B^2$ are connected each to condensers or condenser banks $C^1$ and $C^2$, respectively, which in this case are made up of parallel pairs of condensers in series. The condenser banks $C^1$ and $C^2$ are connected by the conductor $L^3$, and a common lead L from the mid point $L^1$ of this conductor is taken back to the motor carcass or casing F as at $L^2$. In the common lead L a condenser or condenser units $C^3$ may be introduced for the purpose of reducing or varying the capacity of the closed circuit.

The condensers forming the groups $C^1$, $C^2$ are conveniently supported on a block of insulating material D and should be capable of withstanding easily the electrical pressure of the supply. Thus, in applying the invention to a direct-current ironclad motor of 4 horsepower running on a 400 volt supply, the condensers chosen should be capable of withstanding 600 volts and have a capacity of the order of two microfarads each. The condenser $C^3$ may be identical with the other condensers. A high non-inductive resistance R, shown dotted in the drawings, may be placed across the brushes of the motor to act as a damping resistance or to minimize the effect of commutator ripple.

Figure 2:
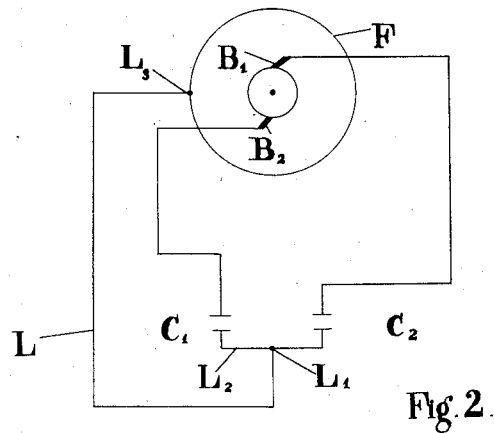
Figure 2 is a diagram of the circuit in its simplified form.

In Figure 2 the circuit is shown with the condenser omitted from the common lead. The frame F of the machine is assumed to be insulated from earth and the brushes $B^1$, $B^2$ are connected through the condensers $C^1$, $C^2$, the mid point $L^1$ of the connection being taken back to a point $L^3$ on the frame F. There need be no additional condenser in the common lead, if the capacities of $C^1$ and $C^2$, which are assumed equal, are chosen or selected such that the oscillations in the closed circuit are not of a frequency audible in the receiving set.

Figure 3:
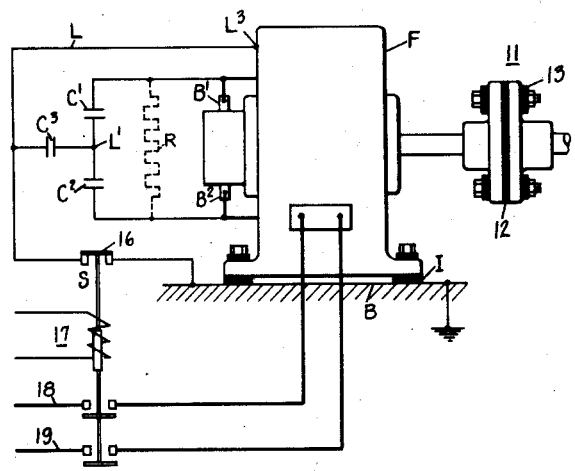
Figure 3 illustrates diagrammatically an electric motor and certain of its associated apparatus arranged in accordance with the invention.

Figure 3 diagrammatically illustrates an electric motor mounted with its motor frame F insulated from the grounded bed plate B by suitable insulating material I, as in Figure 1, and also diagrammatically illustrates a manner by which the electric motor may be insulated from its power coupling 11. As shown, this is effected by positioning a plate of insulating material 12 between the two flanges of the coupling, and by inserting suitably formed insulating bushes and washers 13 between the coupling flanges and the coupling bolts. The motor frame F is thus electrically isolated from earth.

In order to prevent accidents due to the motor frame becoming "alive," a switch S is provided for connecting the frame to earth when it is desired to inspect the motor. The switch may be operated manually, or it may be placed under automatic control, or both. In Figure 1 the switch S is shown diagrammatically as a break in the grounding circuit. A convenient mode of automatic control for the switch S is effected by actuating it by or in conjunction with a motor control switch. This is illustrated in Figure 3 wherein switch S is a set of contacts adapted to be engaged by a bridge 16 of the electromagnetic switch 17. The electromagnetic switch 17 controls the operation of the motor by means of its contact bridges in the motor circuits 18 and 19. As a result of this arrangement, whenever the actuating coil of the electromagnetic motor control switch 17 is energized, the bridge 16 disengages from the S contacts to disconnect the motor frame F from the grounded motor bed B. When the actuating coil of the motor control switch is deenergized, the bridge drops back into engagement with the S contacts to ground the motor frame.

Figures 4, 5:
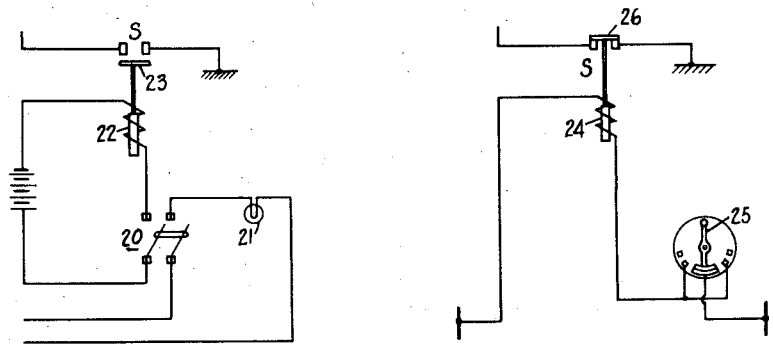
Figure 4 and Figure 5 illustrate schematically alternative circuits for causing the automatic operation of the grounding switch.

The switch S may be operated by means of a relay as a result of the operation of the lighting switch for the room or area in which the motor is placed, so that anyone entering to inspect the motor, in switching on the light, would automatically earth the motor frame. This manner of automatic control is illustrated in Figure 4, wherein the operation of a switch 20 to cause the illumination of a bulb 21 also causes the operation of a relay 22. The relay 22 is provided with a contact bridge 23, so that when the relay is operated the bridge 23 engages the contacts S and connects the motor frame to ground.

Alternatively, the switch S may be automatically controlled by placing a small relay in one of the control circuits of the installation. This is illustrated in Figure 5, wherein there is shown a relay 24 placed in a control circuit for the motor so that the relay is operated whenever the control handle 25 is moved to start the motor. The relay is provided with a contact bridge 26 normally engaging the S contacts to ground the motor frame when the relay 24 is not operated and hence when the motor is not running. The operation of the relay 24 upon the starting of the motor causes the bridge 26 to disengage the S contacts and thus to disconnect the motor frame from the ground.

What is claimed is:—

1. Apparatus for preventing interference with wireless telephonic or telegraphic installations by an operating electric motor or dynamo-electric machine comprising, in combination, a machine having its frame insulated from earth, a connection forming a closed circuit between the brushes and the frame and a condenser capacity in the closed circuit.

2. Apparatus for preventing interference with wireless telephonic or telegraphic installations by an operating electric motor or dynamo-electric machine, comprising, in combination, a machine having its frame insulated from earth, a condenser capacity connected across the brushes and a connection forming a closed circuit between said condenser capacity and the frame of the machine.

3. Apparatus for preventing interference with wireless telephonic or telegraphic installations by an operating electric motor or dynamo-electric machine comprising, in combination, a machine having its frame insulated from earth, a condenser capacity connected across the brushes, a connection forming a closed circuit between the mid point of said condenser capacity and the frame of the machine, and a high non-inductive resistance associated with said closed circuit.

4. Apparatus for preventing interference with wireless telephonic or telegraphic installations by an operating electric motor or dynamo-electric machine comprising, in combination, means for insulating the frame of the machine from earth, a closed circuit between the brushes and the frame, and a capacity in said closed circuit.

5. Apparatus for preventing interference with wireless telephonic or telegraphic installations by an operating electric motor or dynamo-electric machine comprising, in combination, a machine having its frame insulated from earth, a plurality of condenser capacity units in series connected across the brushes of said machine, a connection from a point between the end condenser units to the machine frame, and condenser capacity inserted in said connection.

6. Apparatus for preventing interference with wireless telephonic or telegraphic installations by an operating electric motor or dynamo-electric machine comprising, in combination, means for insulating the frame of the machine from earth, a connection from the brush of one polarity to the frame, a capacity inserted in said connection, a connection from a brush of another polarity to the first named connection, and a capacity inserted in said second named connection.

7. Apparatus for preventing interference with wireless telephonic or telegraphic installations by an operating electric motor comprising, in combination, means for insulating the motor frame from its support, means for insulating the armature of said motor from the shafting mechanically connected thereto, a plurality of condenser units in series connected across the motor brushes, a connection from a point between the end condenser units to the motor frame, and a condenser capacity inserted in said connection.

8. Apparatus for preventing interference with wireless telephonic or telegraphic installations by an operating electric motor or dynamo-electric machine comprising, in combination, means for insulating the structural parts of the machine from earth, a plurality of condenser capacity units in series connected across the brushes of said machine, a connection from a point between the end condenser units to the machine frame, condenser capacity inserted in said connection, and a high non-inductive resistance connected across the brushes of said machine.

9. Apparatus for preventing interference with wireless telephonic or telegraphic installations by an operating electric motor or dynamo-electric machine comprising, in combination, means for insulating the frame of the machine from earth, a connection from the brush of one polarity to the frame, a capacity inserted in said connection, a connection from a brush of another polarity to the first named connection, a capacity in said second named connection, a connection from said frame to earth, and a switch inserted in said third named connection, said switch being adapted when closed to ground said frame.

10. Apparatus for preventing interference with wireless telephonic or telegraphic installations by an operating electric motor or dynamo-electric machine comprising, in combination, means for insulating the frame of the machine from earth, a closed circuit between the brushes and the frame, a capacity in said closed circuit, and means whereby the frame of the machine may be grounded.

11. Apparatus for preventing interference with wireless telephonic or telegraphic installations by an operating electric motor or dynamo-electric machine comprising, in combination, means for insulating the frame of the machine from earth, a connection from the brush of one polarity to the frame, a capacity inserted in said connection, a connection from a brush of another polarity to the first named connection, a capacity inserted in said second named connection, a control switch for said machine, and means responsive to an operation of said control switch to cause the grounding of said frame.

12. Apparatus for preventing interference with wireless telephonic or telegraphic installations by an operating electric motor or dynamo-electric machine comprising, in combination, means for insulating the structural parts of the machine from earth, a plurality of condenser capacity units in series connected across the brushes of said machine, a connection from a point between the end condenser units to the machine frame, condenser capacity inserted in said connection, and means responsive to an incident in stopping said machine to cause the connection of said frame to earth and responsive to an incident in starting said machine for causing the disconnection of said frame from earth.

In testimony whereof I have signed my name to this specification.

ARTHUR JAMES HASWELL.